Jan. 13, 1959 G. R. AVELLONE ET AL 2,868,551
AUTOMATIC COUPLING OR LATCHING MECHANISM
Filed June 28, 1956 2 Sheets-Sheet 1

INVENTORS
Giuseppe R. Avellone
Robert A. Chapellier

BY Eldon H. Luther
ATTORNEY

INVENTORS
Giuseppe R. Avellone
Robert A. Chapellier

BY Eldon H. Luther
ATTORNEY

United States Patent Office 2,868,551
Patented Jan. 13, 1959

2,868,551

AUTOMATIC COUPLING OR LATCHING MECHANISM

Giuseppe R. Avellone, Elmhurst, and Robert A. Chapellier, Whitestone, N. Y., assignors to Combustion Engineering, Inc., New York, N. Y., a corporation of Delaware Application June 28, 1956, Serial No. 594,488

8 Claims. (Cl. 279—76)

This invention relates to coupling or latching devices for releasably retaining two separate members in predetermined relation with each other and has relation to such devices wherein the latching and unlatching action is automatically obtained in a very confined space solely through vertical movement of an actuator.

It is sometimes necessary to obtain an automatic and positive coupling and uncoupling action between two members which are movable relative to each other only in a vertical direction with this coupling and uncoupling action being obtained in a very confined space. This requirement prevails in connection with certain industrial processes that take place within pressure vessels and wherein structural elements must be vertically lowered into and withdrawn from the vessel and while in the vessel must be positively secured in place with space requirements in the vessel being extremely acute. For the purpose of explanation, the invention will be described in such an environment although it is to be understood that this is by way of explanation only, for the invention may be used in other and different environments.

In accordance with the present invention there is provided a frame member which has a vertically disposed opening therein and which is adapted to have lowered thereinto a member that is to be supported by and releasably retained in the frame. This member has a flange which engages the upper end of the frame and limits the insertion of the member into the opening. Mounted upon this member is a latching device which coacts with a recess or keeper provided in the frame to prevent withdrawal of the member from the frame until such withdrawal is desired. This mechanism includes a locking lever pivotally mounted upon the member about a horizontal axis and movable to and from a radially outward position where a finger provided on its lower end is received within the keeper in the frame and a radially inward position where the lever is entirely free of such keeper. Actuation of this lever is had through a preferably vertically disposed cylindrical cam member mounted generally intermediate the upper and lower extremities of the lever and received within a housing secured to the member. This cylindrical cam is vertically movable within the housing between an upper position where it engages the upper end of the lever and cams the lever to its radial inward or unlatched position and a lower position where it engages the lower end of the lever and cams it to and retains it in its radial outward or latched position. Attached to and extending vertically upward from the cylindrical cam and through the upper end of the housing is an actuating rod or stem by which the member is removed from and inserted within the opening in the frame with the upper end of this stem being formed so as to be engaged by suitable manipulating mechanism. The cylindrical cam is urged to its lowermost position by a spring interposed between the housing and the cam with the force developed by this spring being less than the weight of the member and the mechanism attached thereto so that by lifting upward on the stem the spring will be compressed and the cylindrical cam moved to its uppermost position without attempting to lift the member from the opening whereby the lever will be moved to its unlatched position before attempting to withdraw the member from the frame.

It is an object of this invention to provide an improved coupling or latching mechanism for releasably coupling two members together and which is actuatable solely through vertical movement of an actuator.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein.

Figures 1, 2:
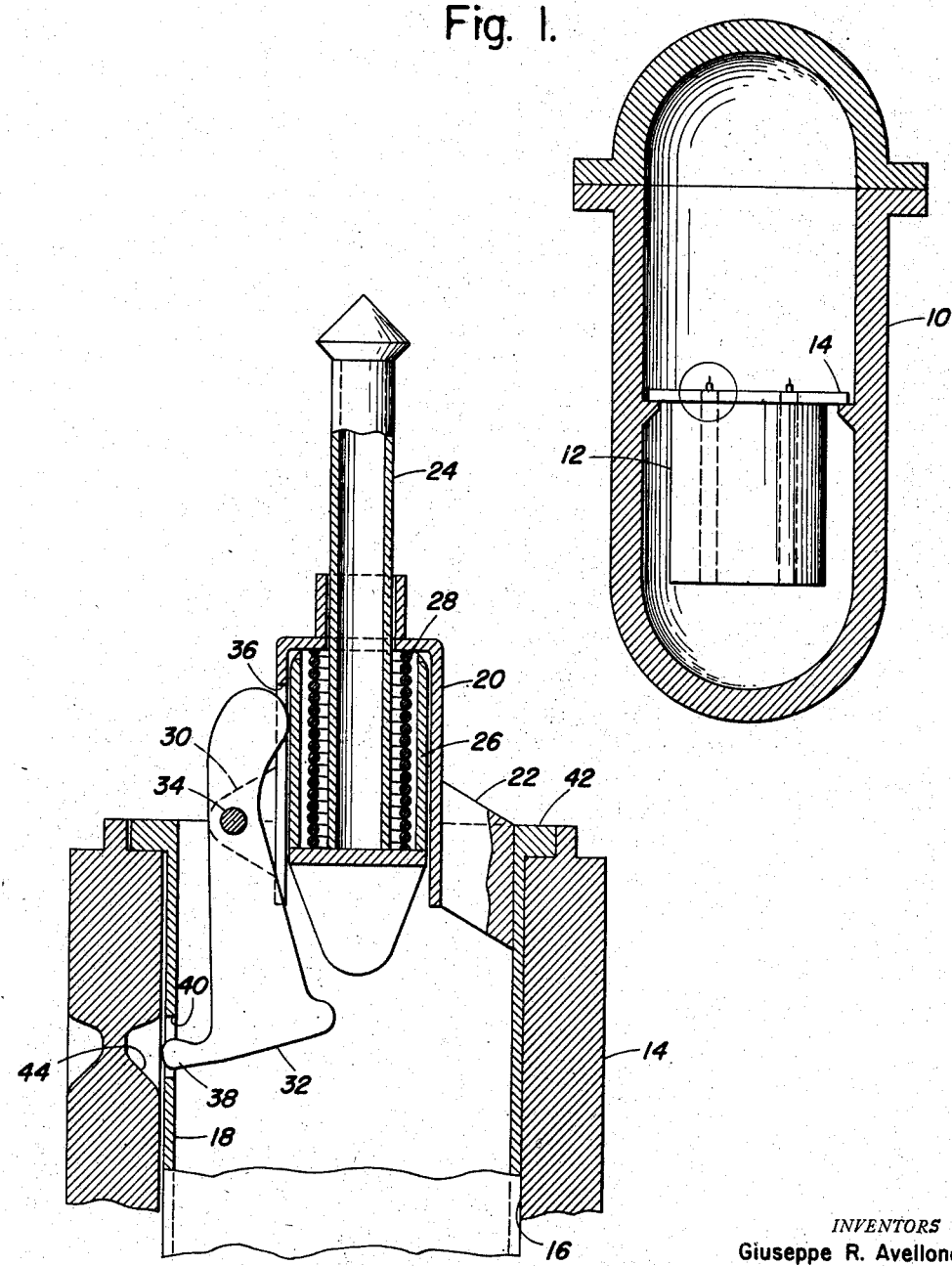
Fig. 1 is a diagrammatic illustration in the form of a vertical section of a pressure vessel in which a suitable process is to be carried out and showing vertically movable members retained within a suitable frame secured within the vessel.
Fig. 2 is a detailed vertical sectional view of the latching mechanism of the invention shown in the unlatched position with this view being an enlarged showing of the mechanism continued generally within the circle shown in Fig. 1.
Figure 4:
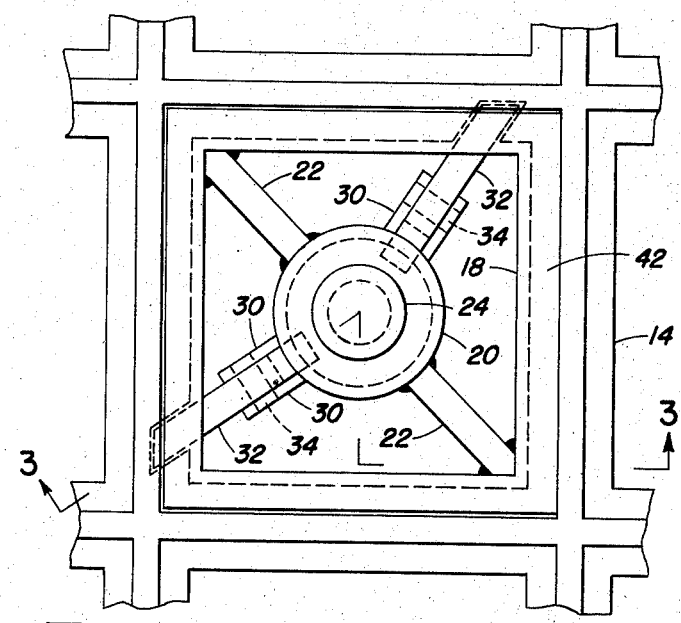
Fig. 4 is a top view of one of the latching mechanisms and is taken generally along line 4—4 of Fig. 3.

Referring now to the drawing, wherein like reference characters are used throughout to designate like elements, there is shown therein a pressure vessel 10 such as may be employed for any desired reaction to be conducted under high pressure and within which is provided a frame 12 for retaining various mechanism or apparatus within the vessel. At the upper end of frame 12 is plate 14 which is provided with numerous openings 16 into each of which there is adapted to be vertically lowered an elongated element 18 which may be a catalyzer or the like for a process that is to be carried out in the vessel and which is preferably snugly received within the opening. The elements 18 may be of any desired cross section with one preferred configuration being illustrated wherein they are square with the openings 16 corresponding with the configuration of the elements. In order that the elements 18 may be positively retained within the frame member 12 after being lowered into place therewithin and still be removed upwardly from this frame member when desired a suitable positively acting latch mechanism is mounted on each of the members which is actuatable in response to insertion and withdrawal of the element from the frame.

As embodied, this latch includes the vertically disposed cylindrical housing 20 that is mounted from and generally within the hollow elongated member 18 by means of the inwardly extending ribs 22. Coaxial with and extending upwardly through the upper end of this housing is stem 24 which has its upper end formed so as to be grasped by suitable manipulating mechanism and which has secured to its lower end cylindrical cam 26. This cam together with stem 24 are vertically movable relative to housing 20 and are biased downward relative to this housing by means of coil spring 28 disposed about stem 24 and within cam 26 and interposed between the upper end of housing 20 and the lower end of the cylindrical cam with this lower end forming a conical nose piece as shown.

Pivotally mounted on housing 20 intermediate each pair of laterally extending brackets 30 is a locking or latching lever 32, two being shown although more may be employed if desired, with pin 34 extending through aligned bores in the brackets and the lever and providing a horizontal pivotal axis for the lever. The wall of housing 20 immediately adjacent each of the levers 32 is relieved forming a slot 36 through which the lever may extend radially inwardly of the housing. Each of the levers is formed so that its upper and lower ends lie within the path of cylindrical cam 26 so that when the cam is moved to its lower position it engages the lower end of the lever and moves it in a clockwise direction as viewed in Figs. 2 and 3 while when the cam is in its upper position it engages the upper end of the lever and moves it in a counterclockwise direction. The lower end of each of the levers is provided with a radially extending finger 38 and the wall of member 18 has an opening 40 through which this finger may extend and be received within the keeper provided in the frame 12 in order to lock this member within the frame.

Figure 3:
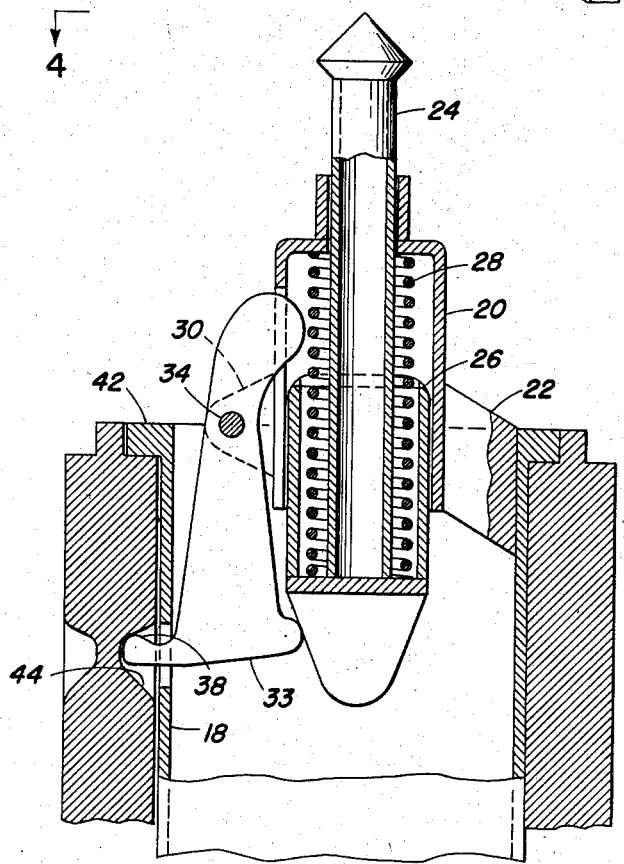
Fig. 3 is a view similar to that of Fig. 2 but showing the latching mechanism in its latched or locked position.

In operation, when one of the elements 18 is vertically lowered into an opening 16 the element is supported from stem 22, with suitable actuating mechanism being secured to the upper end of this stem and the various elements of the latching mechanism are in the relative position shown in Fig. 2 with the upper end of lever 32 having been moved outwardly by cylindrical cam 26 so that each of the levers in effect occupies its radial inward position where finger 38 does not extend through opening 40 and laterally from the element 18. In order for the elements of the latch mechanism to be positioned in this manner the force developed by spring 28 must necessarily be less than the weight of element 18 and the various members or mechanism mounted on this element so that this weight will cause the spring to compress and the upper end of cam 26 to engage the upper end of housing 20. As the member 18 is lowered into opening 16 flange 42 will engage the upper surface of plate 14 of frame 12 thereby preventing the member from being lowered further into the opening so that the weight of the member will no longer be supported by stem 24 permitting spring 28 to expand and move the stem and cylindrical cam 26 downwardly relative to housing 20 with the cam engaging the lower end of lever 32 and moving it to its radial outward position with finger 38 extending through opening 40 in member 18 and being received within recess or keeper 44 provided in the wall of opening 16 immediately adjacent the opening 40. With the elements of the latch mechanism in this position, which is shown in Fig. 3, the member 18 is positively retained within frame 12 and the lever 32 is prevented from moving from its radial outward or latching position because of the engagement of the lower end of cylindrical cam 26 with the lower end of the lever. When it is desired to remove the element 18 from the frame, stem 24 is raised causing spring 28 to compress and cam 26 to cam lever 32 to its radial inward or unlatched position shown in Fig. 2 with the element 18 then being withdrawn from opening 16.

Thus with the present invention the latching and unlatching operation are effected solely through relative vertical movement of the cam actuator and the member 18 permitting latching and unlatching to be accomplished in very confined environments where lateral movement may not be had.

While we have illustrated and described a preferred embodiment of our novel organization it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What is claimed is:

1. In an organization of the type described wherein a locking mechanism is operative to releasably lock against upward movement a vertically disposed member snugly received within an opening in a frame and held against downward movement in the frame at a given location, the combination of a locking lever pivotally mounted on said member for pivotal movement to and from a radial outward position with respect to the vertical axis of the member and a radial inward position, a keeper provided on the frame for receiving a portion of said lever when the same occupies its radial outward position and the member is in said given location with the receipt of the lever in the keeper being effective to prevent relative vertical movement between said frame and member, cam actuating means for said lever including a generally cylindrical member mounted on the elongated member laterally adjacent said lever and vertically movable with respect to said member between an upper and a lower position with said cylindrical member engaging the lever and moving it to its radial inward position when in its upper position and to its radial outward position when in its lower position, spring means urging the cylindrical member to its lower position with a force less than the weight of the elongated member and the apparatus mounted thereon and means for moving said cylindrical member upward against the force of said spring.

2. In combination a frame, a member adapted to be vertically moved into and out of said frame and supported by said frame when lowered thereinto a predetermined distance, a latch mechanism secured to said member and including a housing, a stem extending upwardly from and mounted in said housing for vertical movement with relation thereto between an upper and a lower position, means urging said stem to its lowermost position with a force substantially less than the weight of said member, a locking lever mounted for movement with said member and pivoted about a generally horizontal axis intermediate its ends for pivotal movement to and from a position where one of its ends projects laterally from said member, said frame being provided with a keeper disposed to receive this end of said lever when in said position and when said member is supported by said frame and when received in said keeper preventing upward movement of said member relative to said frame, cam means secured to said stem and operative when said stem is in its lowermost position to cause said lever to move to its position where said end is received within said keeper and to retain the same in said position and when in its uppermost position to cause said lever to move from this position permitting free removal of said member from said frame.

3. A latching mechanism comprising a generally cylindrical housing, an elongated stem disposed within said housing in coaxial relation therewith and with one end extending outward thereof and adapted to be connected to an actuator, a sleeve snugly but slidably received within said housing and connected with the other end of said stem, a support extending laterally outward from said housing a locking lever pivoted to said support about an axis generally normal to a plane containing the axis of said housing, said lever being arranged so that a portion thereof on each side of said pivotal axis lies within the path of said sleeve, said stem and accordingly said sleeve being axially movable with respect to said housing between first and second positions with said sleeve engaging a different one of said portions of the lever when in said first and second positions, respectively, and operative to pivot said lever to and from a radial outward and a radial inward position, spring mechanism biasing said sleeve to the position wherein the lever is in its radial outward position, and means providing a keeper for receipt of said lever when in its radial outward position in a manner preventing relative movement therebetween in a direction axially of said stem.

4. The organization of claim 3 wherein there are a plurality of said locking levers disposed circumferentially about the housing and arranged to be simultaneously pivoted from their radial outward to their radial inward position by said sleeve and wherein said means is provided with a keeper for each of said locking levers.

5. In a latching mechanism, a generally vertical elongated member, a frame having an opening adapted to have said member lowered thereinto and snugly receiving the member, means limiting the insertion of said member into said opening and supporting the same in said frame at a given location, mechanism for releasably restraining said member from upward movement from said frame including a cylindrical housing mounted on said member in generally coaxial relation therewith, a sleeve snugly received within said housing and movable between an upper and a lower position, a stem extending upwardly from said sleeve and adapted to have an actuator connected to its upper end, spring means interposed between said housing and said sleeve to urge the same to its lowermost position with the force developed by said spring being less then the weight of said member and the mechanism mounted thereon, a locking lever mounted for movement with said member and pivoted about a generally horizontal axis, said lever having inwardly projecting portions adjacent its upper and lower ends projecting in the path of said sleeve and said lever being disposed so that the sleeve engages the lower projection when in its lower position to move the lever to a radial outward position and engages the upper projection when in its upper position to move the lever to a radial inward position, said frame having a recess that receives the lever when in its radial outward position in a manner to prevent upward movement of said member relative to the frame.

6. Locking mechanism operative to releasably lock against upward movement a vertically disposed hollow elongated member snugly received within an opening in a frame and held against downward movement in the frame at a given location, a locking lever mounted within said member for pivotal movement to and from a locking position, said lever having a laterally extending finger, the wall of said member having an opening therein opposite said finger and through which said finger projects when the lever is in the locking position, said frame having a recess opposite said opening forming a keeper to receive said finger when the lever is in its locking position and prevent upward movement of said member relative to said frame, cam actuating means for said lever also mounted on said member and including a cam member vertically movable through a predetermined amplitude and when in its lower position engaging said lever and moving it to and retaining it in its locking position and when in its upper position engaging said lever and moving it from its locking position, spring means urging said cam member to its lower position with a force less than the combined weight of the actuating mechanism, the lever and the member, and means for moving said cam member upward against the force of said spring.

7. The organization of claim 6 wherein there are a plurality of said levers disposed about the axis of the elongated member with there being complementary openings and recessess for each lever.

8. The organization of claim 6 wherein the cam actuating means includes a sleeve snugly mounted in a cylindrical housing and provided with a lower conical end disposed so that it engages the lever to move it to its locking position with the upper end of the sleeve disposed to engage the lever to move it from its locking position, a stem connected to said sleeve and extending through the upper end of the housing with the spring means disposed intermediate the upper end of the housing and the lower end of the sleeve.

References Cited in the file of this patent

UNITED STATES PATENTS

| | | |
|---|---|---|
| 2,208,908 | Minor | July 23, 1940 |
| 2,348,426 | Sparrow | May 9, 1944 |
| 2,480,248 | Karlsson | Aug. 30, 1949 |